(12) United States Patent
Zhu et al.

(10) Patent No.: US 9,145,477 B2
(45) Date of Patent: Sep. 29, 2015

(54) NANOCELLULAR THERMOPLASTIC FOAM AND PROCESS FOR MAKING THE SAME

(71) Applicant: Dow Global Technologies LLC, Midland, MI (US)

(72) Inventors: Lingbo Zhu, Midland, MI (US); Stéphane Costeux, Midland, MI (US); Kshitish A. Patankar, Midland, MI (US); Jonathan D. Moore, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/421,851

(22) PCT Filed: Sep. 13, 2013

(86) PCT No.: PCT/US2013/059570
§ 371 (c)(1),
(2) Date: Feb. 16, 2015

(87) PCT Pub. No.: WO2014/052032
PCT Pub. Date: Apr. 3, 2014

(65) Prior Publication Data
US 2015/0203647 A1    Jul. 23, 2015

Related U.S. Application Data

(60) Provisional application No. 61/705,267, filed on Sep. 25, 2012.

(51) Int. Cl.
*C08J 9/00* (2006.01)
*C08J 9/12* (2006.01)
*C08J 9/04* (2006.01)

(52) U.S. Cl.
CPC *C08J 9/04* (2013.01); *C08J 9/0023* (2013.01); *C08J 2203/00* (2013.01); *C08J 2205/042* (2013.01); *C08J 2325/12* (2013.01); *C08J 2333/12* (2013.01)

(58) Field of Classification Search
None
See application file for complete search history.

(56) References Cited

U.S. PATENT DOCUMENTS

| 6,555,589 | B1 | 4/2003 | Tan |
| 6,555,590 | B1 | 4/2003 | Tan |
| 2009/0130420 | A1 | 5/2009 | Thiagarajan et al. |
| 2009/0148665 | A1 | 6/2009 | Thiagarajan et al. |
| 2011/0203488 | A1 | 8/2011 | Xenopoulos et al. |
| 2011/0287260 | A1 | 11/2011 | Sandler et al. |

FOREIGN PATENT DOCUMENTS

| EP | 2594603 | 11/2011 | |
| WO | 2011066060 | 6/2011 | |
| WO | 2011112352 | 9/2011 | |
| WO | WO 2011/112352 A1 * | 9/2011 | ............ C08J 9/12 |
| WO | 2013048761 | 4/2013 | |

OTHER PUBLICATIONS

Lee, et al., "Determination of a mesopore size of aerogels from thermal conductivity measurement", Journal of Non-Crystalline Solids, Mar. 2002, vol. 298, pp. 287-292.
Kumar and Suh, "A Process for Making Microcellular Thermoplastic Parts", Polymer Engineering and Science, Oct. 1990, vol. 30 No. 20, pp. 1323-1329.
Ruiz et al., Journal of Supercritical Fluids 57(2011) 87-94.
Hansen Solubility Parameters: A User's Handbook by Charles M. Hansen, p. 186 (CRC Press, 2nd Ed. 2007).
Colton, J.S., Suh, N.P., Polymer Engineering and Science, 1987, vol. 27, No. 7, 493-499.

* cited by examiner

*Primary Examiner* — Kara Boyle
(74) *Attorney, Agent, or Firm* — Steven W. Mork

(57) ABSTRACT

Prepare a thermoplastic polymer foam having a porosity of 70% or more and at least one of: (i) an average cell size of 200 nanometers or less; and (ii) a nucleation density of at least $1 \times 10^{15}$ effective nucleation sites per cubic centimeter of foamable polymer composition not including blowing agent using a foamable polymer composition containing a thermoplastic polymer selected from styrenic polymer and (meth) acrylic polymers, a blowing agent comprising at least 20 mole-percent carbon dioxide based on moles of blowing agent and an additive having a Total Hansen Solubility Parameter that differs from that of carbon dioxide by less than 2 and that is present at a concentration of 0.01 to 1.5 weight parts per hundred weight parts thermoplastic polymer.

13 Claims, 2 Drawing Sheets

NANOCELLULAR THERMOPLASTIC FOAM AND PROCESS FOR MAKING THE SAME

This invention was made with U.S. Government support under contract DE-EE0003916 awarded by the Department of Energy. The U.S. Government has certain rights in this invention.

BACKGROUND OF THE INVENTION

1. Field of the Invention

The present invention relates to thermoplastic polymer foam having nanometer sized cells and a process for making such foam.

2. Introduction

Polymeric foam articles (or simply "polymeric foams") are common in thermal insulation applications. Many characteristics of polymeric foam affect the thermal conductivity through the foam and, hence, the effectiveness of the foam as a thermal insulator. For instance, it is known that heat transfer through polymeric foam insulation can occur by conduction, radiation and convection (see, for example, teachings in United States patent application publication 2009/0148665). In typical polymeric foam insulation the dominant mode of heat transfer is cell gas conduction, which contributes approximately 75% of the total thermal conductivity. Hence, reducing conduction of cell gas can significantly reduce heat transfer through polymeric foams.

One characteristic affecting thermal conductivity contribution of cell gas is cell size. Cell size has little influence on gas thermal conduction when the cell size is between about one micron and one millimeter in size. Above one millimeter convection behavior tends to increase thermal conductivity. However, when the cell size of foam is less than about one micron the gas conductivity decreases due to what is known as the Knudsen Effect (see, for example, the relationship illustrated in FIG. 1. The curve follows the methodology in Lee, et al., "Determination of a mesopore size of aerogels from thermal conductivity measurement", Journal of Non-Crystalline Solids, March 2002, Vol. 298, pages 287-292). The Knudsen Effect is a phenomenon that results in a decrease in thermal conductivity as fewer cell gas molecules are available within each cell to collide and transfer heat within each single cell. The Knudsen Effect becomes significant as the cell size and connectivity between cells becomes on the same order of magnitude as the mean free path of the gas filling the cells. Thermal conductivity due to cell gas reduces almost in half when the cell size reduces from one micron to 300 nanometer (nm), and reduces by almost ⅔ when the cell size reduces from one micron to below 100 nm. Therefore, it is desirable to achieve cell sizes of 300 nm or less, preferably 100 nm or less to minimize thermal conductivity through foam.

It is further desirable to achieve a homogeneous cell size distribution. Even occasional large cells can reduce the thermal insulation effect of the small (300 nm or less, preferably 200 nm or less, still more preferably 150 nm or less) cells. Therefore, all things being equal, reducing the average cell size of foam to 300 nm or less and particularly to 200 nm or less is desirable to achieve lower thermal conductivity through the foam, especially in foam having a homogeneous cell size distribution. However, it is difficult to reduce the cell size without affecting other properties of a polymeric foam article.

Porosity, the ratio of void volume to foam volume, also affects the thermal conductivity of polymeric foam. Porosity can be expressed as a ratio with a value less than one or as a percentage, which is the ratio multiplied by 100. Generally, decreasing porosity results in an increase in thermal conductivity. That is because thermal conductivity through the polymer network that makes up the walls defining cells of foam is typically greater than thermal conductivity across gas within the cells.

Polymeric foam having an average cell size of 300 nm or less and a porosity of greater than 0.50 is highly desirable but difficult to achieve with known blown foam technology heretofore. Notably, blown foam technology is desirable because unlike aerogel technology, for instance, blown foam technology does not require large volumes of solvents to manufacture.

In developing a process for producing foam having a particular cell size it is useful to consider the number of effective nucleation sites. Effective nucleation sites are the number of sites in a foamable polymer composition that form voids, or cells, when the foamable polymer composition expands into foam (also known as "cell density" in, for example, a paper entitled "A Process for Making Microcellular Thermoplastic Parts" by Kumar and Suh, Polymer Engineering and Science, October 1990, Vol. 30 No. 20, pages 1323-1329). By controlling the number of effective nucleation sites and the porosity one controls the average cell size of the foam. In order to achieve a desirable thermally insulating foam it is desirable to prepare polymeric foam having at least $3 \times 10^{14}$, and preferably $1 \times 10^{15}$ or more, effective nucleation sites per cubic centimeter of non-foamed polymer matrix material (nucleation density) and expand that to have a porosity that is greater than 0.70 (or 70% when as expressed as a percentage). It can be a challenge to induce the necessary number of nucleation sites and achieve the stated porosity when preparing foam having nanometer sized cells.

It would be a desirable advancement in the art of thermally insulating polymer foam to be able to prepare blown polymeric foam having a thickness of at least one millimeter and having a nucleation density of at least $3 \times 10^{14}$, preferably at least $1 \times 10^{15}$ effective nucleation sites per cubic centimeter of non-foamed polymer matrix material and that has expanded to have a porosity that is greater than 70%. Even more desirable would be such polymeric foam that has an average cell size of 300 nm or less, preferably 200 nm or less, more preferably 150 nm or less and yet more preferably 100 nm or less.

Polymeric foam achieving at least part of these desired features has been developed containing nanometer-sized filler particles (nanofiller) as reported in published patent application WO 2011/066060. However, such additives can increase viscosity of a polymer composition as their concentration in the polymer composition increases. As a result, there is a practical limit to the amount of nucleating particles that can be added and efficiently dispersed into a polymer composition for foaming. It is desirable to be able to prepare such a foam without requiring a nanometer-sized filler (that is, in an absence of nanofillers).

Polymeric foam achieving at least part of the aforementioned desired features has also been developed without requiring a nanofillers provided a particular thermoplastic polymer is present as the primary component in the thermoplastic polymer matrix, as reported in WO 2011/112352. Despite the advancements reported in WO 2011/112352, it is yet desirable to find a way to achieve a porosity that is greater than 70%, while further increasing the nucleation density and/or achieving smaller cell sizes over the particular polymer technology disclosed in WO 2011/112352. This is particularly desirable when using a carbon dioxide blowing agent.

Other nanofoam art further illustrates room for advancement in the art field.

Ruiz et al., in Journal of Supercritical Fluids 57(2011) 87-94, disclose a two-step method for making microcellular foam having a cell size in a range of 0.3-300 micrometers using a polymer composition that requires a triblock copolymer. It would advance the art to have a process for preparing nanofoam without requiring a triblock copolymer US2009/0130420 provides a method for preparing polycarbonate nanofoam provided the polymer comprising structural units derived from 2-hycrocarbyl-3,3-bis(hydroxyphenyl)phthalimidine compounds. It is desirable not to have to use this specific polymer or be limited to polycarbonate technology.

Foaming processes utilizing extremely high pressures of carbon dioxide (see for example, U.S. Pat. No. 6,555,589 and U.S. Pat. No. 6,555,590) or explosive depressurization at rates of 15,000 to 200,000 MegaPascals per second (see for example US20110287260) have also been taught as useful to produce polymeric nanofoam. However, the engineering requirements to achieve the required high pressures of carbon dioxide and/or explosive pressure release rates are too extreme to be of practical interest in producing large foam specimens.

It would provide an advance in the art of nanofoam technology to identify a process for preparing thermoplastic polymer nanofoam that has a porosity that is greater than 70%, while further increasing the nucleation density and/or achieving smaller cell sizes over the technology disclosed in WO 2011/112352 and without requiring a triblock copolymer, nanofillers, special polycarbonate polymers or extreme depressurization rates.

BRIEF SUMMARY OF THE INVENTION

The present invention offers an advancement over the teachings in WO 2011/112352 by providing a way to achieve a porosity that is greater than 70%, while further increasing the nucleation density and/or achieving smaller cell sizes over the technology disclosed in WO 2011/112352, particularly when using a carbon dioxide blowing agent.

Surprisingly, the present invention is a result of discovering that including an additive having a solubility in the polymer matrix of the resulting foam within a narrow range of the solubility of carbon dioxide and while being present at a particularly low concentration results in nanofoam having a porosity greater than 70% while achieving smaller cell size and/or higher nucleation density relative to the technology in WO 2011/112352. Moreover, the present invention does not require triblock copolymer, nanofillers, special polycarbonate polymers or extreme pressures or depressurization rates.

In a first aspect, the present invention is a process for preparing thermoplastic polymer foam, the process comprising: (a) providing a thermoplastic polymer selected from styrenic polymers and (meth)acrylic polymers; (b) compounding with the thermoplastic polymer one or more than one additive having a Total Hansen Solubility Parameter that differs from that of carbon dioxide by less than 2, where the total concentration of said one or more than one additive is 1.5 weight-parts or less and 0.01 weight-parts or more based on 100 weight-parts of thermoplastic polymer to form a thermoplastic polymer compound; (c) incorporating into the thermoplastic polymer at an initial pressure sufficient to prevent foaming, either before or after step (b), a blowing agent comprising 20 mole-percent or more carbon dioxide based on total moles of blowing agent; and (d) reducing the pressure on the thermoplastic polymer compound thereby allowing the blowing agent to expand the thermoplastic polymer into thermoplastic polymer foam having a porosity of 70% or more and at least one of (i) an average cell size of 200 nanometers or less; and (ii) a nucleation density of at least $1 \times 10^{15}$ effective nucleation sites per cubic centimeter of foamable polymer composition not including blowing agent; wherein the thermoplastic polymer and thermoplastic polymer foam are free of triblock copolymers and polymers derived from 2-hydrocarbyl-3,3-bis(hydroxyphenyl)phthalimidine compounds and wherein the pressure reduction in step (d) occurs at a rate that is 7,500 mega Pascals per second or less.

In a second aspect, the present invention is a thermoplastic polymer foam article obtainable by the process of the first aspect, wherein the thermoplastic foam article comprises the thermoplastic polymer, the thermoplastic polymer forming a continuous polymer matrix defining multiple cells therein, the thermoplastic polymer foam article characterized by having: (a) one or more than one additive having a Total Hansen Solubility Parameter differing from that of carbon dioxide by less than 2 where the total concentration of said one or more than one additive is 1.5 weight-parts or less and 0.1 weight-parts or more based on 100 weight parts of thermoplastic polymer in the thermoplastic polymer matrix; (b) a porosity of 70% or more; (c) at least one of the following: (i) an average cell size of 200 nanometers or less; and (ii) nucleation density of at least $10^{15}$ effective nucleation sites per cubic centimeter of foamable polymer composition; and further characterized by being free of triblock copolymers and polymers derived from 2-hydrocarbyl-3,3-bis(hydroxyphenyl) phthalimidine compounds.

The process of the present invention is useful for preparing the foam of the present invention. The foam of the present invention is useful as thermal insulating material as well as filtration medium or low k dielectric material.

DETAILED DESCRIPTION OF THE INVENTION

Figure 1:
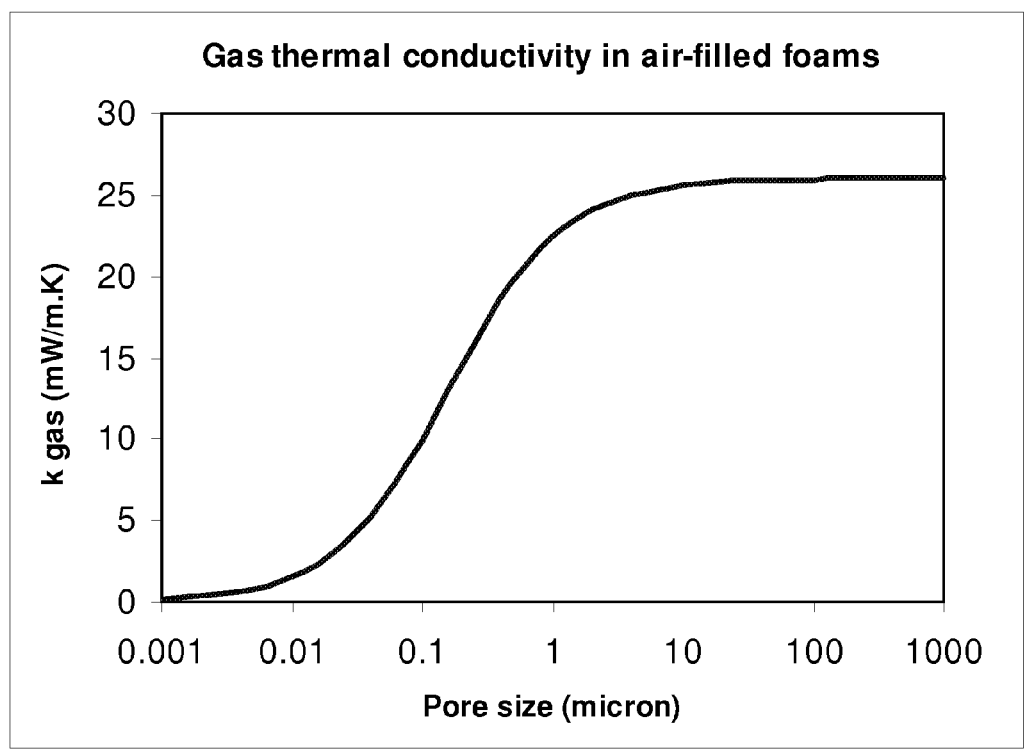
FIG. 1 provides a plot of the gas thermal conductivity in air-filled foams as a function of foam pore size.

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated.

"Polymer", unless indicated otherwise, refers to both homopolymer and copolymer. Unless otherwise indicated, "copolymer" includes block copolymer, graft copolymer, alternating copolymer and random copolymer.

"(meth)acrylic" refers to both "methacrylic" and "acrylic". Hence, a "(meth)acrylic" polymer is a polymer selected from methacrylic polymers and acrylic polymers. "Methacrylic" polymers contain polymerized methacrylic monomers. "Acrylic" polymers contain polymerized acrylic monomers. A "(meth)acrylic" polymer can be a copolymer containing both methacrylic monomers and acrylic monomers and as such can be both a methacrylic polymer and an acrylic polymer. If a copolymer is "(meth)acrylic-free" that means the copolymer lacks both methacrylic and acrylic monomer units copolymerized therein.

"Non-foamed polymer matrix material" refers to the foamable polymer composition that expands into polymeric foam, except not including the blowing agent components, before foaming.

The process of the present invention uses and the foam of the present invention comprises thermoplastic polymers selected from styrenic polymer and (meth)acrylic polymers. These thermoplastic polymers preferably constitute the majority, more preferably 80 weight-percent (wt %) or more, still more preferably 90 wt % or more, yet more preferably 95 wt % or more and can be 100 wt % of the total weight of all thermoplastic polymers, and desirably of all polymers, used in the process of the present invention and present in the foam of the present invention. Desirably, the thermoplastic polymers are selected from styrene-acrylonitrile (SAN) copolymers and (meth)acrylic copolymers. Preferably, the thermoplastic polymer comprises (meth)acrylic copolymer at a concentration of more than 50 weight-percent (wt %) and can be 75 wt % or more, 90 wt % or more, 95 wt % or more and even 100 wt % based on total thermoplastic polymer weight. Particularly desirably (meth)acrylic copolymers include polymethylmethacrylate-co-ethylmethacrylate (PMMA-co-EMA) copolymers.

The present invention further requires one or more than one additive ("Hansen Additive") having a Total Hansen Solubility Parameter that differs from that of carbon dioxide by less than 2, preferably 1.6 or less, more preferably 1.1 or less, still more preferably one or less, still more preferably 0.75 or less and yet more preferably 0.5 or less. The Total Hansen Solubility Parameter characterizes properties of a material. Two materials having similar Total Hansen Solubility Parameters are more likely to be miscible or soluble in one another. The difference between the Total Hansen Solubility Parameter of a component and carbon dioxide is the absolute value of the difference between the Total Hansen Solubility Parameters of the component and carbon dioxide. Therefore, the component can be more or less soluble in the thermoplastic polymer than carbon dioxide as long as the difference is within the range stated above.

The Total Hansen Solubility Parameter is a sum of the dispersion, polar and hydrogen bonding Hansen solubility parameters for a component. Determine the Hansen solubility parameters for a given compound using the Yamamoto-Molecular Break model as implemented in the ebook software and dataset package entitled: HSPiP Hansen Solubility Parameters in Practice" $3^{rd}$ edition, available on the Internet at http://www.hansen-solubility.com/index.php?id=11.

Examples of suitable Hansen Additives include any one or combination of more than one of the following:

(a) carboxylic acids selected from cerotic acid (hexacosanoic acid), lignoceric acid (tetracosanoic acid), behenic acid (docosanoic acid), arachidic acid (eicosanoic acid), stearic acid (acotadecanoic acid), palmitic acid (hexadecanoic acid), myristic acid (tetradecanoic acid), lauric acid (dodecanoic acid), capric acid (decanoic acid), caprylic acid (octanoic acid), and butanoic acid;

(b) hydroxyl acids selected from 24-hydroxytetracosanoic acid, 20-hyroxyeicosanoic acid, 16-hydroxyhexadecanoic acid, 12-hydroxydodecanoic acid, 11-hydroxyundecanoic acid, and 10-hydroxydecanoic acid;

(c) alcohols selected from oleyl alcohol (9-ocatdece-1-ol), carpyl alcohol (1-octanol), capric alcohol (1-decanol), lauryl alcohol (1-dodecanol), myristyl alcohol (1-tetradecanol), cetyl alcohol (1-hexadecanol), stearyl alcohol (1-octadecanol), arachidyl alcohol (1-eicosanol), behenyl alcohol (1-docosanol), lignoceryl alcohol (1-tetracosanol), and ceryl alcohol (1-hexacosanol);

(d) ethyl esters selected from ethyl butanoate, ethyl hexanoate, ethyl octanoate, ethyl decanoate, ethyl dodecanoate, ethyl tetradecanoate, ethyl palmitate, and ethyl eicosanoate; and (e) aldehydes selected from hexanal and decanal.

As a reference, Table 1 provides the Total Hansen Solubility Parameter for carbon dioxide ($CO_2$) and examples of suitable Hansen Additives all in units of $(MPa)^{1/2}$ where MPa is MegaPascals. The Total Hansen Solubility Parameter for carbon dioxide was determined from values in the "Hansen Solubility Parameters: A User's Handbook" by Charles M. Hansen, page 186 (CRC Press, $2^{nd}$ Ed. 2007). Determine Total Hansen Solubility Parameter for carbon dioxide by taking the square root of the sum of the three parts of the Hansen solubility parameter presented on that page of the Hansen book.

The amount of Hansen Additive is important for the practice of the present invention. Too much of the Hansen Additive has surprisingly been found to be detrimental in the production of homogeneous nanofoams by inducing the formation of large cells (several micrometers in size) when present at too high of a concentration.

The total amount of Hansen Additive present is 1.5 weight-parts or less, preferably 1.25 weight-parts or less, still more preferably 1.0 weight-parts or less, even more preferably 0.75 weight-parts or less based on 100 weight-parts of thermoplastic polymer. At the same time it is desirable for the Hansen Additive to be present at a concentration of 0.01 weight-parts or more, preferably 0.05 weight-parts or more, still more preferably 0.1 weight-parts or more and even more preferably 0.25 weight-parts or more based on 100 weight-parts of thermoplastic polymer.

TABLE 1

| Additive | Total Hansen Solubility Parameter $(MPa)^{1/2}$ | Difference from $CO_2$ $(MPa)^{1/2}$ |
|---|---|---|
| $CO_2$ | 17.4 | 0.0 |
| Oleyl alcohol (9-octadecen-1-ol) | 17.6 | 0.1 |
| 16-hydroxyhexadecanoic acid | 19.1 | 1.6 |
| 20-hydroxyeicosanoic acid | 18.5 | 1.0 |
| 24-hydroxytetracosanoic acid | 18.1 | 0.7 |
| caprylic acid (octanoic acid) | 18.2 | 0.7 |
| capric acid (decanoic acid) | 17.9 | 0.4 |
| lauric acid (dodecanoic acid) | 17.6 | 0.1 |
| Myristic acid (tetradecanoic acid) | 17.4 | 0.0 |
| palmitic acid (hexadecanoic acid) | 17.3 | 0.1 |
| Stearic acid (octadecanoic acid) | 17.5 | 0.1 |
| arachidic acid (eicosanoic acid) | 17.2 | 0.3 |
| behenic acid (docosanoic acid) | 17.2 | 0.3 |
| lignoceric acid (tetracosanoic acid) | 17.1 | 0.3 |
| cerotic acid (hexacosanoic acid) | 17.1 | 0.4 |
| capryl alcohol (1-octanol) | 18.6 | 1.2 |
| 1-nonanol | 18.4 | 1.0 |
| capric alcohol (1-decanol) | 18.1 | 0.7 |
| Lauryl alcohol (1-dodecanol) | 17.8 | 0.4 |
| Myristyl alcohol (1-tetradecanol) | 17.7 | 0.2 |
| cetyl alcohol (1-hexadecanol) | 17.5 | 0.1 |
| stearyl alcohol (1-octadecanol) | 17.4 | 0.1 |
| arachidyl alcohol (1-eicosanol) | 17.3 | 0.1 |
| behenyl alcohol (1-docosanol) | 17.2 | 0.3 |
| lignoceryl alcohol (1-tetracosanol) | 17.1 | 0.3 |
| ceryl alcohol (1-hexacosanol) | 17.2 | 0.3 |
| ethyl butanoate | 17.4 | 0.0 |

TABLE 1-continued

| Additive | Total Hansen Solubility Parameter (MPa)$^{1/2}$ | Difference from $CO_2$ (MPa)$^{1/2}$ |
|---|---|---|
| ethyl hexanoate | 17.1 | 0.4 |
| ethyl octanoate | 17.0 | 0.5 |
| ethyl decanoate | 17.0 | 0.5 |
| ethyl dodecanoate | 17.0 | 0.5 |
| ethyl tetradecanoate | 16.8 | 0.6 |
| ethyl palmitate | 16.8 | 0.6 |
| ethyl eicosanoate | 16.8 | 0.6 |
| hexanal | 18.6 | 1.1 |
| decanal | 17.7 | 0.2 |

The process of the present invention includes compounding the Hansen Additive with the thermoplastic polymer to form a thermoplastic polymer compound. Compounding can be done by any standard compound procedure known in the art for incorporating additives into a thermoplastic polymer. For example, compounding can be accomplished by melt mixing the Hansen Additive with the thermoplastic polymer in a batch process using a shear or elongational mixer. Compounding can alternatively be done by continuously mixing using an extruder. It is desirable to do the compounding in a closed vessel unless the Hansen Additive has negligible volatility at the temperature and pressure at which mixing occurs. The compounding procedure can include grinding polymers in to a power and/or mixing the polymer with the Hansen Additive using a solvent that is removed prior to foaming.

Other additives can also be provided and compounded into the thermoplastic polymer as part of the thermoplastic polymer compound. Other additives can include any one or any combination or more than one component selected from compatibilizers, fire retardants (such as halogenated compounds, including brominated polymers, as well as phosphorous-containing compounds), stabilizers, plasticizers, pigments, colorants, infrared attenuating agents. The thermoplastic polymer compound and resulting polymer foam can contain or be free from nucleating additives, particularly in the form of nanofillers. One of the advantages of the present invention is that nanofiller additives as nucleators are unnecessary to achieve the resulting nanofoam. However, nucleating additives can be present in the broadest scope of the present invention. Suitable nucleators include polyhedral oligomeric silsesquioxane (POSS) and silica nanoparticles. The present invention, however, can be free of inorganic nanoparticles if so desired. The other additives are typically present at a concentration of five wt % or less, and can be present at a concentration of one wt % or less or even 0.1 wt % or less, even 0.01 wt % or less where wt % is relative to total thermoplastic polymer compound weight.

At any point or at multiple points before, during or after compounding the Hansen Additive into the thermoplastic polymer, incorporate a blowing agent into the thermoplastic polymer. The combination of thermoplastic polymer composition and blowing agent creates a foamable polymer composition. Creation of the foamable polymer composition occurs at and the foamable polymer composition remains under an initial pressure that is sufficient so as to dissolve the blowing agent into the thermoplastic polymer and to preclude foaming of the foamable polymer composition due to expansion of the blowing agent. Desirably, the initial pressure is 10 megaPascals (MPa) or higher, preferably 20 MPa or higher, even more preferably 30 MPa or higher in order to fully dissolve blowing agent in the thermoplastic copolymer composition. At the same time, the initial pressure is generally less than 70 MPa, preferably 50 MPa or less, still more preferably 40 MPa or less in order to avoid having to handle extreme pressures, which can keep the process from being of practical interest in producing foam at large scales.

The concentration of total blowing agent in a foamable polymer composition is desirably 18 wt % or more, preferably 20 wt % or more, even more preferably 22 wt % or more and most preferably 24 wt % or more in order to achieve desirable porosity. At the same time, the amount of blowing agent is generally 50 wt % or less, typically 40 wt % or less and often 35 wt % or less. Wt % is based on total foamable polymer composition weight.

The blowing agent comprises carbon dioxide at a concentration of 20 mole-percent (mol %) or more, preferably 50 mol % or more and can be 75 mol % or more and even 100 mol % based on the total moles of blowing agent. Desirably, carbon dioxide is present at a concentration of 20 wt % or more, preferably 22 wt % or more and most preferably 25 wt % or more. At the same time, carbon dioxide is typically present at a concentration of 50 wt % or less, preferably 40 wt % or less and most preferably 35 wt % or less. Wt % is relative to the total weight of the foamable polymer composition.

Blowing agents other than carbon dioxide, if present, can be selected from any blowing agent commonly used for preparing polymeric foam. Suitable blowing agents include one or more than one of the following: inorganic gases such as argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

The process further includes reducing the pressure on the thermoplastic polymer compound and thereby allowing the blowing agent to expand the thermoplastic polymer into thermoplastic polymer foam. Once all of the blowing agent and any desirable additional additives are mixed into a foamable polymer composition the foamable polymer composition is rapidly exposed to an atmosphere at a lower pressure than the initial pressure in order to allow foaming to occur. The rate of depressurization can influence the effective nucleating site density. Desirably, the rate of depressurization is 10 MegaPascals per second (MPa/s) or higher, preferably 20 MPa/s or higher, more preferably 100 MPa/s or more, still more preferably 200 MPa/s or higher, yet more preferably 500 MPa/s or higher and even more preferably one gigaPascal per second (GPa/s) or higher. At the same time, the rate of depressurization is 7.5 GPa/s or lower, preferably 5 GPa/s or lower and still more preferably 3 GPa/s or lower.

The foamable polymer composition begins expansion at the foaming temperature of the expandable polymer composition. The foaming temperature for the foamable polymer composition is a temperature wherein the foamable polymer composition is in a softened state yet is below the softening temperature of the neat thermoplastic polymers of the foamable polymer composition. Desirably, the foaming temperature is 40° C. or more, preferably 50° C. or more below the softening temperature for the neat thermoplastic polymer matrix. The reason the foaming temperature can be so low is because the blowing agent plasticizes the thermoplastic polymer resin thereby lowering the softening temperature of the foamable polymer composition below the softening temperature of the neat thermoplastic polymer.

The softening temperature for a thermoplastic polymer is the glass transition temperature for an amorphous polymer and the melting temperature for a semi-crystalline polymer. If a thermoplastic polymer comprises more than one continuous amorphous polymer, the softening temperature is the highest glass transition temperature of the continuous amorphous polymers. Likewise, if the thermoplastic polymer comprises more than one continuous semicrystalline polymer, the softening temperature is the highest melting temperature of the continuous semicrystalline polymers. If the thermoplastic polymer comprises both continuous amorphous and continuous semicrystalline polymers, the softening temperature is the higher of the highest glass transition temperature of the continuous amorphous polymers and the highest melting temperature of the continuous semicrystalline polymers.

During expansion, the foamable polymer composition expands to form a polymeric foam article. Optionally, an additional conditioning step is beneficial wherein the resulting foam is exposed to further heat (for example by exposure to hot air, hot water or hot oil) and/or possibly steam to induce additional expansion before becoming a polymeric foam article of the present invention.

Foaming can occur by any foaming technique suitable for preparing thermoplastic polymeric foams including batch tank foaming and extrusion foaming.

In batch tank foaming provide a thermoplastic polymer matrix that contains the Hansen Additive and any other optional additives into a pressure vessel (tank), provide blowing agent into the vessel and pressure the inside of the vessel sufficiently high so as to dissolve the blowing agent in the thermoplastic polymer matrix to a desired concentration. Once a desired concentration of blowing agent is dissolved in the thermoplastic polymer matrix the pressure in the vessel is relieved while the thermoplastic polymer matrix is in a softened state at the foaming temperature and the thermoplastic polymer matrix is allowed to expand into a thermoplastic polymeric foam article. Typically, dissolving blowing agent into the thermoplastic polymer matrix under pressure is sufficient to plasticize the thermoplastic polymer matrix into a softened state without requiring heating above the neat polymer matrix softening temperature (softening temperature in an absence of carbon dioxide), although heat may be applied to the tank if necessary to soften the thermoplastic polymer matrix to facilitate foaming.

An extrusion foam process comprises providing a foamable composition in an extruder at an initial pressure and in a softened state and then expelling the foamable composition at a foaming temperature into an environment of lower pressure than the initial pressure to initiate expansion of the foamable composition into a thermoplastic polymer foam. An extrusion process can be continuous or semi-continuous (for example, accumulative extrusion). In a general extrusion process, prepare a foamable polymer composition by mixing a thermoplastic polymer with a blowing agent in an extruder by heating a thermoplastic polymer composition to soften it, mixing a blowing agent composition together with the softened thermoplastic polymer composition at a mixing (initial) temperature and initial pressure that precludes expansion of the blowing agent to any meaningful extent (preferably, that precludes any blowing agent expansion), desirably cool the foamable polymer composition to a foaming temperature rather than use the initial temperature as the foaming temperature, and then expelling the foamable composition through a die into an environment having a temperature and pressure below the foaming temperature and initial pressure. Upon expelling the foamable composition into the lower pressure the blowing agent expands the thermoplastic polymer into a thermoplastic polymer foam. Desirably, cool the foamable composition after mixing and prior to expelling it through the die. In a continuous process, expel the foamable composition at an essentially constant rate into the lower pressure to enable essentially continuous foaming.

Suitable extrusion foam processes may benefit from cooling the foamable polymer composition to a foaming temperature below the initial temperature before expanding and extensive mixing of foamable polymer composition after cooling to the foaming temperature and prior to extrusion.

Accumulative extrusion is a semi-continuous extrusion process that comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone having a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand into foam.

Coalesced strand foam processes are also suitable embodiments of the present extrusion process. In general, during a coalesced strand foam process, a foamable polymer composition extrudes through a die containing multiple orifices oriented such that when the foamable polymer composition expands upon extrusion, the resulting strands of foaming polymer contact one another and partially coalesce together. The resulting foam article ("strand foam") is a composition of foam strands extending in the extrusion direction of the foam. A skin typically defines each strand in the coalesced strand foam. While coalesced strand foam processes are suitable, the process can be free of forming independent foam strands and then subsequently fusing the strands together to form stand foam.

Extruded foams and batch tank foams are distinct from expanded polymer bead foam by being free from encapsulated collections of beads. While a strand foam has a skin similar to bead foam, the skin of a strand foam does not fully encapsulate groups of cells but rather forms a tube extending only in the extrusion direction of the foam. The polymeric foam articles of the present invention are preferably batch tank polymeric foam (polymeric foam prepared from a batch tank process) or extruded polymeric foams. Desirably the process of the present invention is a batch tank process or an extrusion foam process.

The foaming process can include a secondary expansion (post expansion or post foaming) step. A secondary expansion step occurs after forming a foam from the thermoplastic polymer by heating the resulting foam for a period of time to soften the polymer and expand the gas in the cells. Typically a secondary expansion step occurs within several minutes of the initial foaming. Heating during the secondary expansion can be accomplished, for example, by subjecting the foam to heated air, heated oil, heated water and/or steam for a period of time.

The resulting thermoplastic polymer foam is characterized by having a porosity of 70 percent (%) or more and at least one of: (i) an average cell size of 200 nanometers or less; and (ii) a nucleation density of at least $10^{15}$ effective nucleation sites per cubic centimeter of non-foamed polymer matrix material.

The porosity of a foam characterizes the extent of void volume in the foam. Polymeric foam comprises a polymer matrix that defines within it multiple cells. The volume of the cells of a foam corresponds to the void volume in the foam. Determine porosity of a foam as a percentage (p %) from the density of the foam ($\rho_f$) and the density of the polymer matrix material (all non-void material) of the foam ($\rho_m$) using the following equation:

$$p\% = [1-(\rho_f/(\rho_m)] \times 100\%$$

Porosity can also be expressed as a ratio ($\rho$) instead of a percentage using the following equation:

$$p = [1-(\rho_f/(\rho_m)]$$

Determine the density of the polymeric foam article ($\rho_f$) by the Archimedes method of ASTM method D-1622-03. Polymeric foam articles of the present invention desirably have a foam density of less than 0.2 grams per cubic centimeters (g/cm$^3$), and can have a density of 0.18 g/cm$^3$ or less.

Desirably, the porosity of foam of the present invention is 75% or more, preferably 80% or more and can be 90% or more.

Desirably, the polymeric foam article has an average cell size of 200 nanometers (nm) or less, preferably 150 nm or less, still more preferably 100 nm or less. Typically, the average cell size is at least 10 nm, or even 20 mm or more. Desirably, the polymeric foam article is substantially free of large cells, meaning that the volume fraction of cells larger than one micron is 10% or less, preferably 5% or less and still more preferably one percent or less relative to total foam volume. Notably, the polymeric foam can appear as a reticulated or reticular structure of polymeric struts in which case cells sizes correspond to the openings between struts.

Measure the number-average cell size ("average cell size") of a polymer foam by: (a) preparing a cross section of the polymer foam by cryo-fracturing the foam; (b) examining a representative portion of the cross section by scanning electron microscopy (SEM), where the representative portion has dimensions in a range of two microns by two microns to ten microns by ten microns; (c) measuring the cell size (distance across the cell, e.g., diameter) of 50-200 random cells in the portion of the cross section; and (d) determining the average of all measured sizes.

Desirably, the cell size has a monomodal cell size distribution. However, in any embodiment where the cells size distribution is other than monomodal the process of measuring average cell size should incorporate selection of cells for measuring diameter without consideration of whether the cell size is large or small in order to obtain a true average cell size.

For optimal thermal insulation properties it is desirable for 70% or more, preferably 80% or more and still more preferably 85% or more of all cells in the polymeric foam article have a cell size of less than 200 nanometers.

The polymeric foam is further characterized by an effective nucleation site density as reported in number of sites per cubic centimeter (cm$^3$) of non-foamed polymer matrix material. The number of effective nucleation sites is equivalent to the number of nucleation sites that develop into a unique cell in the final foam. To be clear, cells that independently nucleate but that coalesce into a single cell correspond to a single effective nucleation site. Cells that nucleate, but collapse and disappear prior to formation of the final foam do not count as effective nucleation sites. Preferred embodiments of the thermoplastic polymeric foam article have an effective nucleation site density of $1 \times 10^{15}$ or more, preferably $3 \times 10^{15}$ or more, still more preferably $1 \times 10^{16}$ or more and can be $1 \times 10^{17}$ or more per cubic centimeter of foamable polymer composition. Typically, the effective nucleation site density is less than about $1 \times 10^{19}$.

Determine the effective nucleation site density ($N_0$) for a polymeric foam article from the porosity ratio (p) of the polymeric foam article, the average cell size in nanometers ($d_{nm}$), the density of the polymeric foam article ($\rho_f$) and density of non-void material in the foam article ($\rho_m$), both in grams per cubic centimeter (g/cm$^3$). Start by calculating the average cell volume ($V_{cell}$) using:

$$V_{cell} = \frac{\pi d_{nm}^3/6}{10^{21}}$$

Determine the average number of cells per cubic centimeter of foam ($N_c$) using:

$$N_c = \frac{p}{V_{cell}} = \left[10^{21}\frac{1-\rho_f/\rho_m}{\pi d_{nm}^3/6}\right]$$

Determine the effective nucleation density ($N_0$) using:

$$N_0 = \frac{N_c}{1-p} = \left[10^{21}\frac{\rho_m/\rho_f-1}{\pi d_{nm}^3/6}\right]$$

Figure 2:
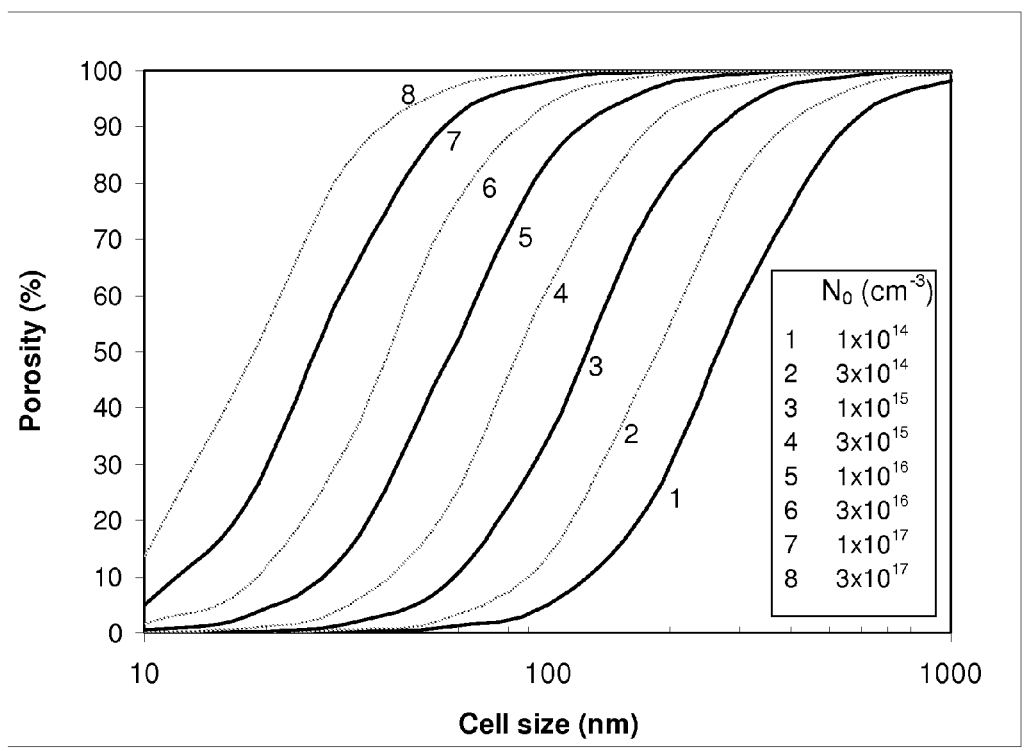
FIG. 2 provides a plot of porosity versus cell size for polymeric foam.

Porosity, effective nucleation site density and average cell size are all inter-related and any two of the values allows calculating of the third. FIG. 2 illustrates a plot of porosity percentage versus average cell size and includes lines designating effective nucleation site density values. Such a plot allows one to use any two of porosity, average cell size and effective nucleation site density to determine the third.

In one embodiment the thermoplastic foam article of the present invention can further have a crosslinked thermoplastic polymer matrix. Crosslinking a thermoplastic polymer matrix can occur upon irradiation of the polymer matrix with the proper frequency radiation. Often, the polymer matrix contains an initiator that instigates crosslinking and/or serves as a crosslinker between polymer chains upon irradiation. Irradiation to achieve crosslinking, if done, typically occurs after all expansion is complete. Irradiation can occur as expansion proceeds, but that is a more difficult process and causes viscosity increase in the polymer matrix during expansion.

In contrast to teachings in certain prior art, the thermoplastic polymer and thermoplastic polymer foam of the present invention are free of triblock copolymer and polymers derived from 2-hydrocarbyl-3,3-bis(hydroxyphenyl)phthalimidine compounds.

The following examples serve to illustrate embodiments of the present invention.

Examples

The following examples use as a thermoplastic polymer a polymer selected from Table 1 or Table 2. Table 1 lists three different polymethylmethacrylate-co-ethyl methacrylate (PMMA-co-EMA) copolymers available from Scientific Polymer Products. Table 2 lists the characteristics of a SAN copolymer (TYRIL™ 125, TYRIL is a trademark of The Dow Chemical Company).

TABLE 1

| Polymer | Mn (kg/mol) | Mw (kg/mol) | Mw/Mn | Tg (° C.) | MMA (wt %) | EMA (wt %) |
|---|---|---|---|---|---|---|
| SP1 | 121 | 372 | 3.07 | 91.4 | 45.2 | 54.8 |
| SP2 | 160 | 460 | 2.88 | 97.1 | 52.0 | 48.0 |
| SP3 | 158 | 379 | 2.40 | 90.7 | 47.5 | 52.5 |

TABLE 2

| Polymer | Mn (kg/mol) | Mw (kg/mol) | Mw/Mn | Tg (° C.) | Styrene (wt %) | Acrylonitrile (wt %) |
|---|---|---|---|---|---|---|
| SAN1 | 45 | 96 | 2.11 | 107.6 | 68 | 32 |

Compositions for the Comparative Examples (Comp Exs) and Examples (Exs) are provided below with a characterization the resulting thermoplastic polymer foam. Each Comp Ex and Ex followed a similar procedure for compounding and foaming.

POSS Master Batch

Prepare a master batch of polyhedral silsesquioxane (POSS) for use in select examples below in the following manner. Obtain POSS from Hybrid Plastics Inc. (catalog number MA0735). Dissolve one gram of the POSS in four grams of ethanol and add the resulting solution to 49 grams of a powder form of the thermoplastic polymer identified below for the example and compound together in a Haake blender at 180° C. and using a mixing speed of 60 revolutions per minute mixing speed for ten minutes. Use nitrogen to reduce the ethanol content in the vapor space above the resulting melt. Remove the masterbatch from the Haake mixer and cool to room temperature. The resulting master batch contains 2 weight-parts POSS per hundred weight parts thermoplastic polymer.

Compounding and Foaming

Prepare a thermoplastic polymer composition for each example by batch mixing together the polymer, Hansen Additive and, if specified, POSS masterbatch in a Haake blender at 180° C. and 60 revolutions per minute mixing speed for ten minutes. Compression mold the continuous polymer phase composition at 200 degrees Celsius (° C.) and 8.6 MegaPascals pressure for two minutes into a plaque having a thickness of 1.5 millimeters to form copolymer sheet. Cut the plaque into pieces having a width of four to six millimeters and a length of 20 millimeters for use in the foaming process.

Prepare polymeric foam by a batch foaming process using a high pressure stainless steel vessel connected to a source of pressurized carbon dioxide and containing a pressure release valve. The volume of the vessel is between seven and 55 milliliters. Insert into the vessel the pieces of the copolymer sheet, which will serve as the thermoplastic polymer matrix for the foam so as to fill approximately 5-10% of the vessel volume. Over filling the vessel will preclude sufficient expansion of the polymer during foaming. Seal the vessel with the thermoplastic polymer (pieces of copolymer sheet) inside and pressurize the vessel with carbon dioxide to a Soak Pressure (specified below) and condition to a Soak Temperature (specified below). Allow the vessel to remain pressurized for a specific Soak Time (specified below) and then rapidly release the pressure in the vessel using the pressure release valve to achieve a depressurization rate between 0.7 and 3 gigaPascals (GPa) per second. Inside the vessel, the polymer matrix foams to form a polymeric foam article. For select samples identified below perform a secondary expansion within one minute of depressurization by immersing the polymeric foam article in to a heated water bath at the temperature and for the time indicated for the example or comparative example.

The resulting polymeric foam articles in each of the Examples have a thickness in a range of three to six millimeters.

Compositions and Characterizations

Comp Ex A and Exs 1-4

Carboxylic Acid Hansen Additives

Prepare the following Comp Ex A (no Hansen Additive) and Exs 1-4 using SP2 as the thermoplastic polymer and a Soak Pressure of 30 MPa, Soak Time of 6 hours and Soak Temperature of 35° C. There is no secondary expansion. Comp Ex A and Exs 1-4 are made using a 7 milliliter vessel and a depressurization rate that is between 0.7 and 1.5 GPa/second. Table 3 contains characterization of Comp Ex A and Exs 1-4.

TABLE 3

| Example | Hansen Additive[a] | Average Cell size (nm) | Porosity (%) | Effective Nucleation Site Density (cites per cm$^3$) |
|---|---|---|---|---|
| Comp Ex A | (none) | 85 | 73 | $8.6 \times 10^{15}$ |
| 1 | 0.75 pph SA | 85 | 75 | $9.3 \times 10^{15}$ |
| 2 | 1.0 pph SA | 85 | 78 | $10.7 \times 10^{15}$ |
| 3 | 0.75 pph MA | 85 | 76 | $9.9 \times 10^{15}$ |
| 4 | 1.0 pph MA | 85 | 78 | $10.8 \times 10^{15}$ |

[a]Hansen Additives are reported in weight parts per hundred relative to 100 weight parts thermoplastic polymer (pph).
SA = stearic acid (Hansen Solubility Parameter difference from $CO_2$ = 0.1).
MA = Myristic Acid (Hansen Solubility Parameter difference from $CO_2$ = 0.0).

The data in Table 3 reveals that use of the Hansen Additive surprisingly increases the resulting effective nucleation site density without detrimentally increasing average cell size or detrimentally decreasing porosity. In fact, inclusion of the Hansen Additive surprisingly increases porosity. Exs 1-4 reveal an increase in effective nucleation site density ranging from 8% to 26% over Com Ex A while maintaining an average cell size of approximately 85 nanometers (nm) and a porosity above 70%.

Comp Ex B and Exs 5-8

Carboxylic Acid Hansen Additives with Secondary Expansion

Prepare the following Comp Ex B (no Hansen Additive) and Exs 5-8 using SP2 as the thermoplastic polymer and a Soak Pressure of 33 MPa, Soak Time of 6 hours and Soak Temperature of 40° C. Treat the resulting foam to a secondary expansion in a water bath at 70° C. for three minutes. Comp Ex B and Exs 5-8 are made using a 7 milliliter vessel and a depressurization rate that is between 0.7 and 1.5 GPa/second. Table 4 contains characterization of Comp Ex B and Exs 5-8.

The data in Table 4 reveals that use of the Hansen Additive surprisingly increases the resulting effective nucleation site density without detrimentally increasing average cell size or detrimentally decreasing porosity even when using a secondary expansion step. Exs 6-9 reveal an increase in effective nucleation site density ranging from 21% to 42% over Comp Ex B while maintaining an average cell size of approximately 95 nanometers (nm) and a porosity above 70%.

TABLE 4

| Example | Hansen Additive[a] | Average Cell size (nm) | Porosity (%) | Effective Nucleation Site Density (cites per cm$^3$) |
|---|---|---|---|---|
| Comp Ex B | (none) | 95 | 82 | $9.9 \times 10^{15}$ |
| 5 | 0.75 pph SA | 95 | 85 | $12.7 \times 10^{15}$ |
| 6 | 1.25 pph SA | 90 | 82 | $12.0 \times 10^{15}$ |
| 7 | 0.75 pph MA | 95 | 83 | $13.1 \times 10^{15}$ |
| 8 | 1.0 pph MA | 90 | 84 | $14.1 \times 10^{15}$ |

[a]Hansen Additives are reported in weight parts per hundred relative to 100 weight parts thermoplastic polymer (pph).
SA = stearic acid (Hansen Solubility Parameter difference from $CO_2$ = 0.1).
MA = Myristic Acid (Hansen Solubility Parameter difference from $CO_2$ = 0.0).

Comp Exs C and D and Exs 9-14

Various Hansen Additives, Secondary Expansion and POSS Nucleator

Prepare the following Comp Ex C (no Hansen Additive) and Exs 9-12 using SP3 as the thermoplastic polymer and a Soak Pressure of 33 MPa, Soak Time of 5 hours and Soak Temperature of 47° C. Treat the resulting foam to a secondary expansion in a water bath at 65° C. for three minutes. Each of Comp Ex C and Exs 9-12 contain 0.25 weight parts POSS per hundred weight parts thermoplastic polymer. Comp Exs C and D and Exs 9-12 are made in a 50 milliliter vessel and using a depressurization rate between 2.5 and 3 GPa per second. Table 5 contains characterization of Comp Exs C and D and Exs 9-14.

TABLE 5

| Example | Hansen Additive[a] | Hansen Solubility Parameter Difference from $CO_2$ | Average Cell size (nm) | Porosity (%) | Effective Nucleation Site Density (cites per cm$^3$) |
|---|---|---|---|---|---|
| Comp Ex C | (none) | — | 160 | 83 | $2.3 \times 10^{15}$ |
| 9 | 0.5 pph 1-nonanol | 1.0 | 150 | 83 | $2.8 \times 10^{15}$ |
| 10 | 0.5 pph tetradecanol | 0.2 | 150 | 85 | $3.1 \times 10^{15}$ |
| 11 | 0.5 pph oleyl alcohol | 0.1 | 160 | 85 | $2.6 \times 10^{15}$ |
| 12 | 0.5 pph 1-octadecanol | 0.1 | 130 | 85 | $4.7 \times 10^{15}$ |

[a]Hansen Additives are reported in weight parts per hundred relative to 100 weight parts thermoplastic polymer (pph).

Prepare Comp Ex D (no Hansen Additive) and Exs 13-14 using SP1 As the thermoplastic copolymer and a Soak Pressure of 33 MPa, Soak Time of 2 hours and Soak Temperature of 50° C. Treat the resulting foam to a secondary expansion in a water bath at 65° C. for two minutes. Each of Comp Ex D and Exs 13-14 contain 0.05 weight parts POSS per hundred weight parts thermoplastic polymer. Table 6 contains characterization of Comp Ex D and Claims 13 and 14.

TABLE 6

| Example | Hansen Additive[a] | Hansen Solubility Parameter Difference from $CO_2$ | Average Cell size (nm) | Porosity (%) | Effective Nucleation Site Density (cites per cm$^3$) |
|---|---|---|---|---|---|
| Comp Ex D | (none) | — | 240 | 84 | $0.7 \times 10^{15}$ |
| 13 | 0.05 pph lignoceric acid | 0.3 | 210 | 85 | $1.1 \times 10^{15}$ |
| 14 | 0.05 pph 16-hydroxy-hexadecanoic acid | 1.6 | 190 | 85 | $1.6 \times 10^{15}$ |

[a]Hansen Additives are reported in weight parts per hundred relative to 100 weight parts thermoplastic polymer (pph).

The data in Table 5 and Table 6 reveals that use of various different Hansen Additives surprisingly increases the resulting effective nucleation site density without detrimentally increasing average cell size or detrimentally decreasing porosity even in the presence of POSS nucleators and with a secondary expansion. Exs 9-12 reveal that various different Hansen Additives cause an increase in effective nucleation site density ranging from 13-104% over Comp Ex C while maintaining an average cell size proximate to Comp Ex C and below 200 nanometers (nm) and a porosity similar to that of Comp Ex C and above 70%. Exs 13-14 reveal that various different Hansen Additive cause an increase in effective nucleation site density ranging from 57-129% over Comp Ex D while maintaining an average cell size of approximately 200 nanometers and a porosity similar to that of Comp Ex D and above 70%.

Comp Ex E and Exs 15-16

SAN Polymer with POSS Nucleator

Prepare the following Comp Ex E (no Hansen Additive) and Exs 15-16 using SAN1 as the thermoplastic polymer and a Soak Pressure of 33 MPa, Soak Time of 24 hours and Soak Temperature of 30° C. Conduct a secondary expansion at 60° C. for three minutes in a hot water bath. Comp Ex D and Exs 15-16 each contain 0.25 weight parts POSS per hundred weight parts thermoplastic polymer. Comp Ex E and Exs 15-16 are made in a 50 milliliter vessel and using a depressurization rate between 2.5 and 3 GPa per second. Table 7 contains characterization of Comp Ex E and Exs 15-16.

TABLE 7

| Example | Hansen Additive[a] | Average Cell size (nm) | Porosity (%) | Effective Nucleation Site Density (cites per cm$^3$) |
|---|---|---|---|---|
| Comp Ex E | (none) | 200 | 65 | $0.5 \times 10^{15}$ |
| 15 | 0.5 pph myristic acid | 190 | 72 | $0.7 \times 10^{15}$ |
| 16 | 1.0 pph myristic acid | 190 | 70 | $0.7 \times 10^{15}$ |

[a]Hansen Additives are reported in weight parts per hundred relative to 100 weight parts thermoplastic polymer (pph). Myristic Acid has a Hansen Solubility Parameter difference from $CO_2$ of 0.0.

The data in Table 7 reveals that use of the Hansen Additive surprisingly increases the resulting effective nucleation site density without detrimentally increasing average cell size or detrimentally decreasing porosity for the SAN thermoplastic polymer foam. In fact, the Hansen Additive actually causes an increase in porosity in Exs 15 and 16. Exs 15 and 16 reveal an increase in effective nucleation site density of 40% over Com Ex E while maintaining an average cell size below 200 nanometers (nm) and a porosity at or above 70%.

What is claimed is:

1. A process for preparing thermoplastic polymer foam, the process comprising:
   a. providing a thermoplastic polymer selected from styrenic polymers and (meth)acrylic polymers;
   b. compounding with the thermoplastic polymer one or more than one additive having a Total Hansen Solubility Parameter that differs from that of carbon dioxide by less than 2 where the total concentration of said one or more than one additive is 1.5 weight-parts or less and 0.01 weight-parts or more based on 100 weight-parts of thermoplastic polymer to form a thermoplastic polymer compound;
   c. incorporating into the thermoplastic polymer at an initial pressure sufficient to prevent foaming, either before or after step (b), a blowing agent comprising 20 mole-percent or more carbon dioxide based on total moles of blowing agent; and
   d. reducing the pressure on the thermoplastic polymer compound thereby allowing the blowing agent to expand the thermoplastic polymer into thermoplastic polymer foam having a porosity of 70% or more and at least one of (i) an average cell size of 200 nanometers or less; and (ii) a nucleation density of at least $1 \times 10^{15}$ effective nucleation sites per cubic centimeter of foamable polymer composition not including blowing agent;
wherein the thermoplastic polymer and thermoplastic polymer foam are free of triblock copolymers and polymers derived from 2-hydrocarbyl-3,3-bis(hydroxyphenyl)phthalimidine compounds and wherein the pressure reduction in step (d) occurs at a rate that is 7,500 mega Pascals per second or less.

2. The process of claim 1, further characterized by the styrenic polymers being selected from stryene-acrylonitrile copolymers and the (meth)acrylic polymers being selected from (meth)acrylic copolymers.

3. The process of claim 2, further characterized by the thermoplastic polymer being selected from styrene-acrylonitrile copolymer and poly(methyl methacrylate)-co-poly (ethyl methacrylate) copolymer.

4. The process of claim 1, wherein the (meth)acrylic polymer is 95 weight-percent or more of total thermoplastic polymer weight.

5. The process of claim 1, further characterized by the one or more additive (a) being selected from a group consisting of stearic acid, myristic acid, 16-hydroxyhexadecanoic acid, carpylic acid, oleyl alcohol, 1-nonanol, 1-tetracosanoic acid, 16-hydroxyhexadecanoic acid, 1-tetradecanol, and 1-octadecanol.

6. The process of claim 1, further characterized by further compounding polyhedral oligomeric silsesquioxane with the thermoplastic polymer so polyhedral oligomeric silsesquioxane is in the thermoplastic polymer compound.

7. A thermoplastic polymer foam article obtained by the process of claim 1, wherein the thermoplastic foam article comprises the thermoplastic polymer, the thermoplastic polymer forming a continuous polymer matrix defining multiple cells therein, the thermoplastic polymer foam article characterized by having:
   a. one or more than one additive having a Total Hansen Solubility Parameter differing from that of carbon dioxide by less than 2 where the total concentration of said one or more than one additive is 1.5 weight-parts or less and 0.1 weight-parts or more based on 100 weight parts of thermoplastic polymer in the thermoplastic polymer matrix;
   b. a porosity of 70% or more;
   c. at least one of the following:
      i. an average cell size of 200 nanometers or less; and
      ii. a nucleation density of at least $10^{15}$ effective nucleation sites per cubic centimeter of foamable polymer composition;
and further characterized by being free of triblock copolymers and polymers derived from 2-hydrocarbyl-3,3-bis(hydroxyphenyl)phthalimidine compounds.

8. The thermoplastic polymer foam article of claim 7, further characterized by the styrenic polymers being selected from styrene-acrylonitrile copolymers and the (meth)acrylic polymers being selected from (meth)acrylic copolymers.

9. The thermoplastic polymer foam article of claim 8, further characterized by the thermoplastic polymer being selected from styrene-acrylonitrile copolymer and poly(methyl methacrylate)-co-poly(ethyl methacrylate) copolymer.

10. The thermoplastic polymer foam of claim 7, wherein the (meth)acrylic polymer is 95 weight-percent or more of all thermoplastic polymers in the thermoplastic polymer matrix.

11. The thermoplastic polymer foam of claim 7, further comprising polyhedral oligomeric silsesquioxane.

12. The thermoplastic polymer foam of claim 7, further characterized by the one or more additive (a) being selected from a group consisting of stearic acid, myristic acid, 16-hydroxyhexadecanoic acid, carpylic acid, oleyl alcohol, 1-nonanol, 1-tetracosanoic acid, 16-hydroxyhexadecanoic acid, 1-tetradecanol, and 1-octadecanol.

13. The thermoplastic polymer foam of claim 7, further characterized by having both an average cell size of 200 nanometers or less and a nucleation density of at least $10^{15}$ effective nucleation sites per cubic centimeter of foamable polymer composition.

\* \* \* \* \*